(12) United States Patent
Zaitsev (10) Patent No.: US 8,782,793 B2
(45) Date of Patent: Jul. 15, 2014

(54) SYSTEM AND METHOD FOR DETECTION AND TREATMENT OF MALWARE ON DATA STORAGE DEVICES

(75) Inventor: Oleg V. Zaitsev, Smolensk (RU)

(73) Assignee: Kaspersky Lab ZAO, Moscow (RU)

( * ) Notice: Subject to any disclaimer, the term of this patent is extended or adjusted under 35 U.S.C. 154(b) by 141 days.

(21) Appl. No.: 13/477,283

(22) Filed: May 22, 2012

(65) Prior Publication Data

US 2013/0318610 A1    Nov. 28, 2013

(51) Int. Cl.
*G06F 21/00* (2013.01)
*G06F 21/56* (2013.01)
*H04L 29/06* (2006.01)

(52) U.S. Cl.
CPC .............. *G06F 21/56* (2013.01); *G06F 21/568* (2013.01); *H04L 63/1441* (2013.01); *H04L 63/1416* (2013.01); *H04L 63/14* (2013.01); *G06F 21/564* (2013.01); *G06F 21/561* (2013.01); *G06F 21/566* (2013.01)
USPC ................. 726/24; 726/22; 726/23; 713/187; 713/188

(58) Field of Classification Search
CPC . H04L 63/14; H04L 63/1408; H04L 63/1416; H04L 63/1441; H04L 63/145; H04L 29/06877; H04L 29/06884; H04L 29/06897; H04L 29/06911; H04L 29/06918; G06F 21/56–21/568; G06F 11/1446; G06F 11/1448; G06F 11/1451; G06F 11/1456; G06F 11/1458; G06F 11/1461; G06F 11/1466; G06F 11/1469
USPC .............................. 726/22–25; 713/187–188
See application file for complete search history.

(56) References Cited

U.S. PATENT DOCUMENTS

| | | | |
|---|---|---|---|
| 6,542,975 B1 * | 4/2003 | Evers et al. ................... | 711/162 |
| 7,591,018 B1 | 9/2009 | Lee | |
| 2005/0177868 A1 * | 8/2005 | Kwan .............................. | 726/11 |
| 2007/0038677 A1 * | 2/2007 | Reasor et al. ................. | 707/200 |
| 2007/0079379 A1 * | 4/2007 | Sprosts et al. .................. | 726/24 |
| 2009/0037496 A1 * | 2/2009 | Chong et al. .................. | 707/204 |
| 2009/0113128 A1 | 4/2009 | Zhao | |
| 2011/0197280 A1 * | 8/2011 | Young et al. .................... | 726/24 |
| 2013/0061325 A1 * | 3/2013 | Singh et al. ..................... | 726/24 |
| 2013/0227691 A1 * | 8/2013 | Aziz et al. ....................... | 726/24 |

OTHER PUBLICATIONS

Protecting Portable Storage with Host Validation by Butler et al; Publisher: ACM; Date: Oct. 2010.*
European Search Report from the counterpart European Application No. EP12177002.

* cited by examiner

*Primary Examiner* — Madhuri Herzog
(74) *Attorney, Agent, or Firm* — Arent Fox LLP; Michael Fainberg (57) ABSTRACT

Disclosed are systems and methods for detection and repair of malware on data storage devices. The system includes a controller, a communication interface for connecting an external data storage device, and a memory for storing antivirus software. The antivirus software is configured to scan the data contained in the data storage device, perform repair or removal of malicious files or programs found on the data storage device, identify suspicious files or programs on the data storage device and malicious files or programs that cannot be repaired or removed from the data storage device, send information about these files or programs to the antivirus software provider, receive updates for the antivirus software from the antivirus software provider, and rescan the suspicious files or programs and malicious files or programs that cannot be repaired or removed using updated antivirus software.

18 Claims, 4 Drawing Sheets

SYSTEM AND METHOD FOR DETECTION AND TREATMENT OF MALWARE ON DATA STORAGE DEVICES

TECHNICAL FIELD

The invention relates to the field of computer security, and, in particular to a system and method for detection and repair of malware on portable data storage devices.

BACKGROUND

It is hard to imagine a modern corporate office, regardless of its size, without a computer network. Networks provide fast exchange of information between personal computers (PC) connected thereto and access to shared network resources and devices. However, it is necessary to manage and control access of PCs to the corporate network and access of external data storage devices, such as Flash drives and other mass data storage devices, to the corporate network. In a typical corporate environment, hundreds of instances of connection of such data storage devices to the corporate PCs are registered daily. And often, such data storage devices contains harmful software (i.e., malware), which can cause significant damage to the PC to which the device is connected. In addition, the malware can spread through the network and cause damage to other PCs as well. Such incidents often require company's IT staff to spend time identifying the malware and removing it from the infected PCs. Also, such infections can cause loss of commercial secrets and even financial losses.

Even if corporate PCs have antivirus applications, computers are not 100% protected against possible malware infections from directly connected data storage devices. Such situations may arise, for example, when a user of a corporate PC has not updated antivirus databases of the antivirus software for a long time, and unbeknownst to the user connected to the PC a Flash drive containing a new type of malware, which may not be detected by the antivirus application using outdated antivirus databases. This malware may spread to other PCs in the corporate network causing significant damage or loss of information. There are many other scenarios in which oversight or inexperience of PC users can cause malware infections.

Also, repair of a data storage device, such as a Flash drive, infected with a malware can cause different problems, including damage to the device itself. For example, when an antivirus application detects a malware on a data storage device and removes malware's executable components, the antivirus application may leave untouched malware's autorun.inf file, which is typically used for the automatic launch of applications and programs from a data storage device under Windows OS. As a result, the data storage device will no longer be detectable when it is connected to a PC. Also, if, for example, antivirus application detected a harmful software on the data storage device and tries to repair or remove executable components of the detected malware, and, at this time, the user extracts the data storage device from the PC, then the file system of the data storage device may be damaged and cause total loss of data on the device. This may happen because antivirus applications typically do not inform user about repair or removal of malware from Flash drives.

Accordingly there is a need for improved systems and methods for detection and repair of malware on portable data storage devices, such as Flash drives and the like.

SUMMARY

Disclosed system, methods and computer program products for detection and repair of malware on data storage devices. In one example embodiment, the system for detection and repair of malware includes a controller, a communication interface for connecting an external data storage device, and a memory for storing antivirus software. The antivirus software is configured to scan the data contained in the data storage device, perform repair or removal of malicious files or programs found on the data storage device, identify suspicious files or programs on the data storage device and malicious files or programs that cannot be repaired or removed from the data storage device by the antivirus software, report these files or programs to the user, send information about these files or programs to the antivirus software provider, receive updates for the antivirus software from the antivirus software provider, and rescan at least the suspicious files or programs and malicious files or programs that cannot be repaired or removed using provided antivirus updates.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of a system and method for detection and repair of malware on portable storage devices. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
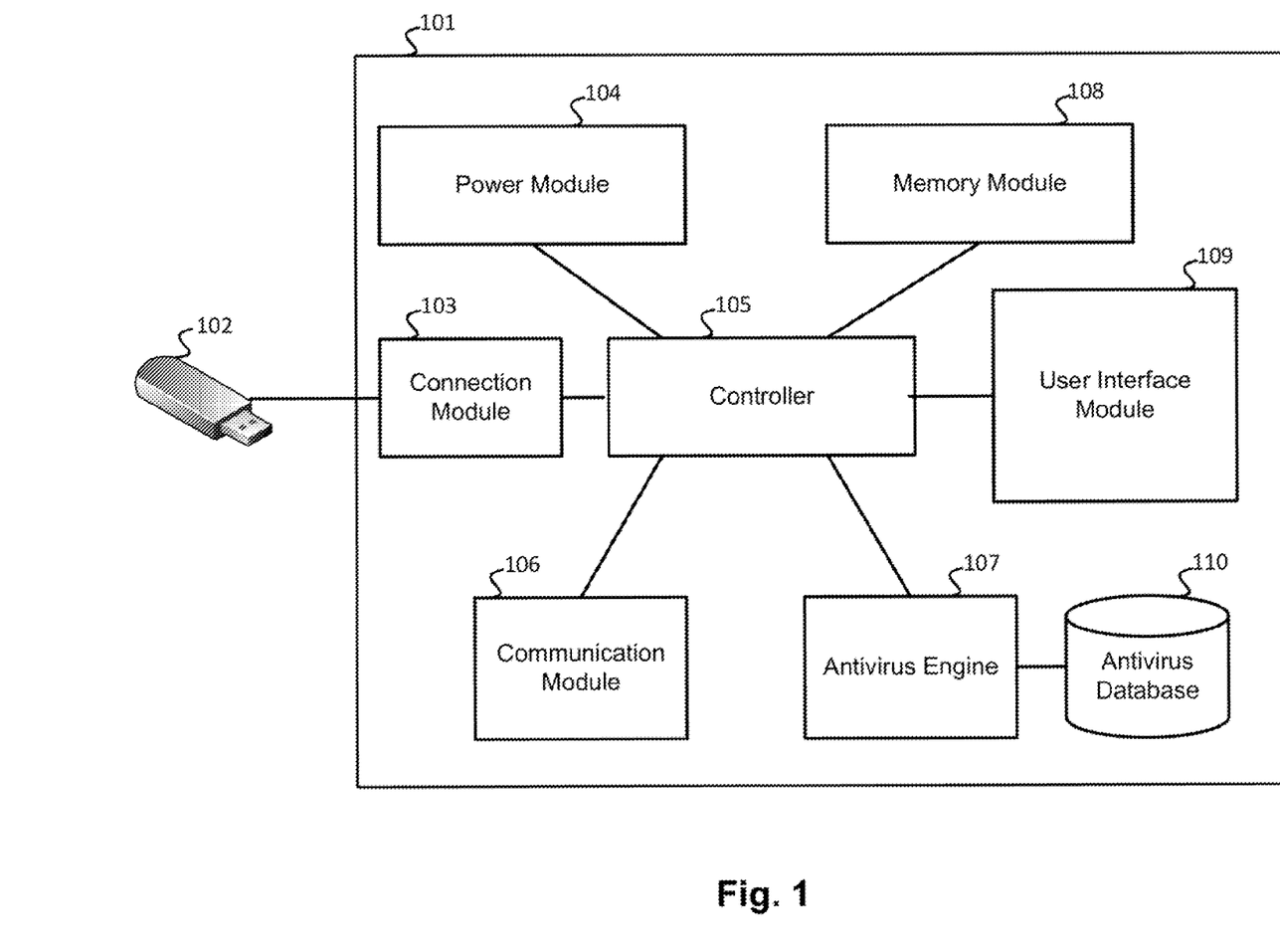
FIG. 1 illustrates a schematic diagram of a system for detection and repair of malware on data storage devices according to one example embodiment.

FIG. 1 illustrates a system for detection and repair of malware on data storage devices. System 101 includes a connection module 103, such as a USB, MiniUSB, eSATA or FireWire interface, for connecting external data storage devices 102, such as Flash drives. It should be noted that system 101 may have multiple different connection modules 103 used for connecting different types of data storage devices. Connection module 103 is connected to the controller 105, which is designed to transfer data between the modules of system 101.

System 101 also includes a communication module 106 which facilitates data communication with networked PCs, remote servers or other processing/communication devices over the Internet. Communication module 106 may use wireless communication technology, such as UMTS/CDMA (3G), WIMAX/LTE (4G), WiFi, HSPA, EDGE, as well as wired data transfer technologies such as USB, Ethernet, optical fiber, ASDN, xDSL, and others.

System 101 also includes a power module 104 which provides power during off-line operation of system 101 for a long time without need for recharging. The power module 104 can be galvanic cell or battery, for example, lithium-ionic. The power module 104 can be charged when system 101 is connected through the connection module 103 to a PC.

System 101 also includes an antivirus engine 107 configured to scan data storage devices 102, such as Flash drives, for the presence of files infected by malware, such as viruses, Trojans and worms, perform repair of infected files and/or removal of malware. Antivirus engine 107 may include one or more of the following antivirus products, including, but not limited to, Kaspersky Antivirus, Kaspersky Antivirus of for Windows workstations, Kaspersky Antivirus for Linux workstations, McAfee Antivirus, Norton Antivirus or similar products.

In one example embodiment, the antivirus engine 107 can be implemented in the form of several separate software modules, each of which is configured to perform a specific task. For example, one module may perform signature verification, the other heuristic analysis and so on. The antivirus engine 107 is configured to uses random access memory, which may be provided by the controller 105 according to one example embodiment.

In one example embodiment, the antivirus engine 107 is connected to an antivirus database 110, which contains the information necessary for antivirus scanning and repair. This information includes, but not limited to signatures of known clean and malicious programs, the heuristic analysis algorithms, and other types of information. In addition, the antivirus engine 107 may store in the antivirus database 110 suspicious files for subsequent transmission to the servers of an antivirus software developer using the communication module 106.

System 101 also includes a memory module 108 used for backing up data stored on the data storage device 102 during antivirus scan thereof by the antivirus engine 107. The antivirus engine 107 and antivirus database 110 may also be stored in memory module 108. The memory module 108 can be, for example, a Flash drive memory of NOR or NAND type.

System 101 also includes a user interface module 109 configured to allow a user to initiate operation of system 101, notify user about operational state of the system, display result of the antivirus analysis, and receive user instructions upon completion of antivirus analysis. In one example embodiment, the user interface module 109 can be implemented as a light emitting diode (LED) or liquid crystal display (LCD) with graphical user interface (GUI) and touch screen functionality. The module 109 may also indicate progress of antivirus scanning and the result of this scanning, for example, such events as "Flash drive has been tested and does not contain any infected files and/or malware" and "Flash drive has been tested and contains infected files and/or malware". Module 109 may also include a speaker and can use audio signals that allow the user to assess such events as the end of the antivirus scan or the presence of suspicious files, infected files or malicious programs, which cannot be repaired or removed from the data storage device 102. It should be noted that power module 104, memory module 108, communication module 106 and antivirus database 110 are optional modules, and system 101 can operate without them.

It should be noted that there may be other embodiments of the system 101. For example, system 101 can be implemented as a USB adapter, which could be inserted in the USB port of a PC. A data storage device 102, such as a Flash drive, can be inserted into this USB adapter for antivirus scanning by the system 101. In another embodiment, system 101 can be implemented as a USB hub that allows simultaneous antivirus scanning of multiple data storage devices 102, such as Flash drives or the like, connected to the USB hub.

Figure 2A:
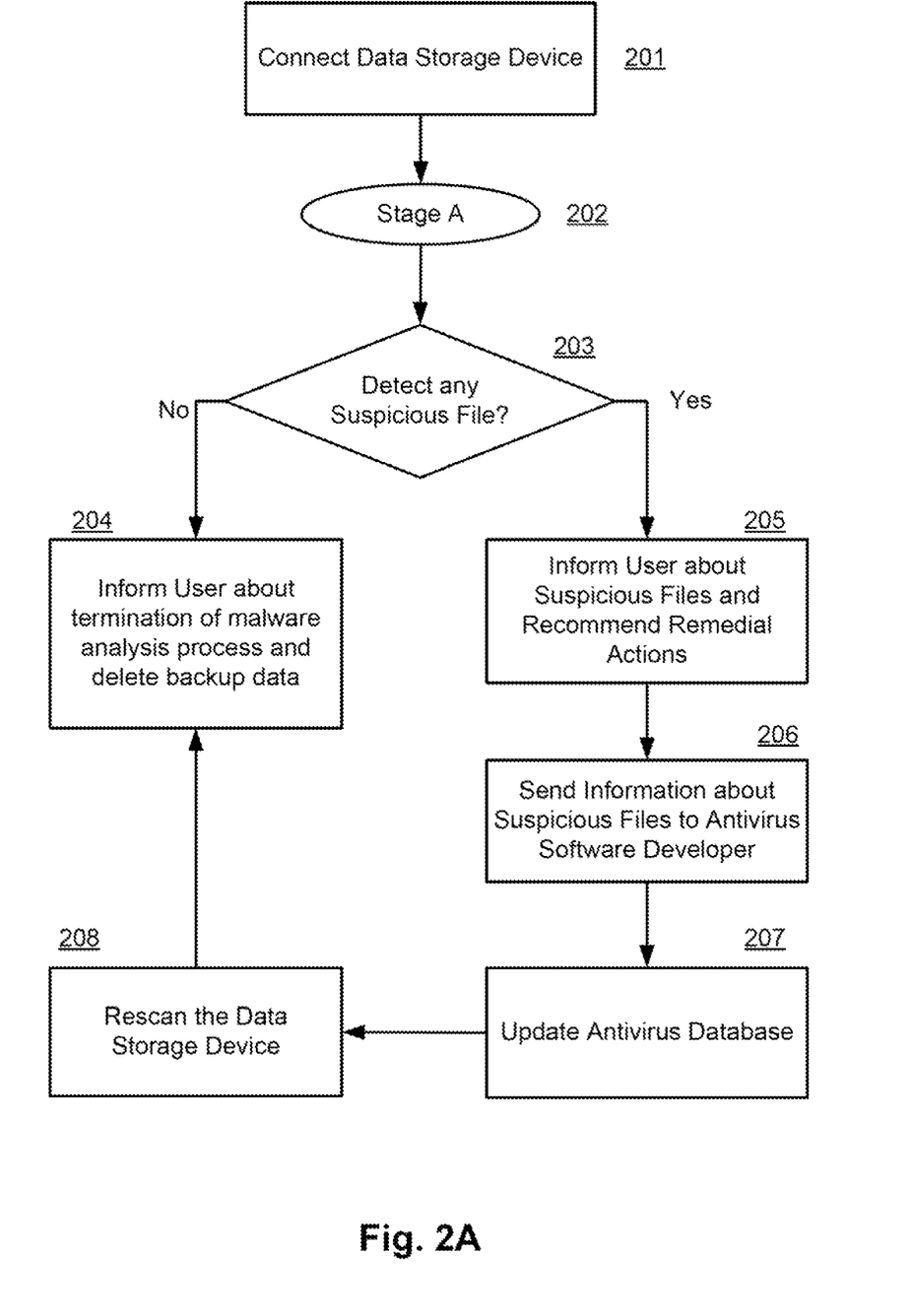
FIGS. 2a and 2b illustrate flow diagrams of operation of the system for detection and repair of malware on data storage devices according to one example embodiment.
Figure 2B:
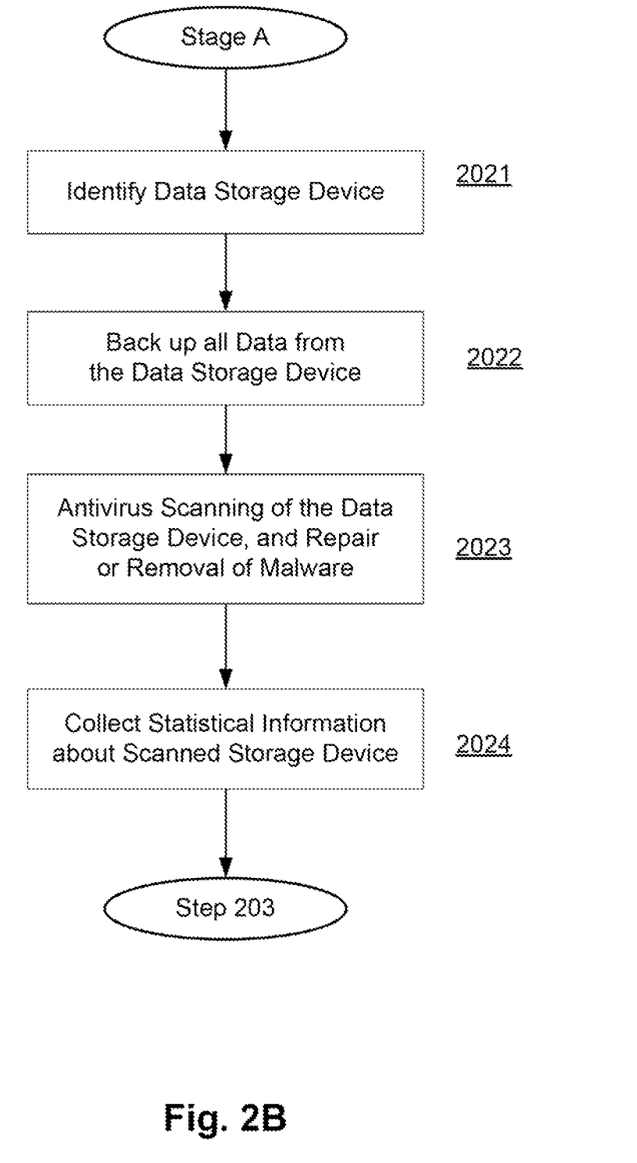

FIGS. 2a and 2b illustrate methods of operation of the above-described system for detection and repair of malware on data storage devices. At step 201, a user of the data storage device 102, such as a Flash drive, connects the device to the connection module 103, such as a USB port, of system 101. The process then continues to Stage A shown in FIG. 2b. Thus, at step 2021, after the data storage device 102 is connected to system 101, the controller 105 may receive from the device 102 information about the name of the device, the type of device memory and its volume, the name of device manufacturer, and other information identifying data storage device 102. The controller 105 then creates a backup area, for example, partition or folder in the memory module 108, dedicated to storing data from device 102 and names it using any folder or data identifying the storage device 102. For example, the controller 105 may choose the name of the storage drive 102, the amount of its memory, or information about the device manufacturer as the name of the partition or folder on the memory module 108. It should be noted that any data collected by the controller 105 at this initial stage can be used for subsequent identification of the connected device 102.

After the controller 105 make the partition or folder in the memory module 108 for backup of data from Flash drive 102, at step 2022, the controller 105 copies in the created partition or folder, all of the data stored in the device 102. Thus, the memory module 108 will contain a backup copy of all data stored on the drive 102. The backup data may be copied back to the device 102, if during antivirus scanning and malware repair of the data storage device 102 by the antivirus engine 107 any of the data of the device 102 is corrupted.

Next, at step 2023, the controller 105 will receive and transfer all of the data stored on the device 102 to the antivirus engine 107 for antivirus scanning. It should be noted that the order of transmission of information in various versions of the system 101 may be different. For example, in one example embodiment, the backup of data from the device 102 and the antivirus scanning of the device 102 can be performed simultaneously. Having received data from the device 102, the antivirus engine 107 starts the antivirus scan of the received data using antivirus definitions and other malware-related data stored in the antivirus database 110. During the scan, antivirus engine 107 may indicate to controller 105 each of the scanned files and the time until the end of the scan. The controller 105 may transmit this information to user interface module 109 for displays to the user. Therefore, the user gets real-time feedback during the progress of the antivirus scanning of the data storage device 102.

Depending on the implementation of user interface module 109, information displayed to the user may include dynamically changing information about the scanned files, time remaining until the end of scanning process, and other information on the progress of the antivirus scan. In addition, module 109 may inform the user when the scan is complete and when the data storage device 102 can be disconnected from the system 101 without the threat of data loss or damage to the device 102. Also at this stage, antivirus engine 107 will perform repair or removal of any infected files or malicious programs detected on the device 102.

Next, at step in 2024, the antivirus engine 107 collects in the antivirus database 110 various statistical information about scanned files and any malware found on the data storage device 102. The database 110 may include a dedicated partition or folder for storage of this information, which can be identified by any information that identifies the device 102. Therefore, all information about the scanned files, detected and removed or not removed malicious programs, as well as suspicious files stored on the device 102 is stored in the appropriate section of the antivirus database 110. In the future, for example, this information can be sent over to the antivirus software developing company for further analysis.

Next, back to step 203 of FIG. 2a, in which the antivirus engine 107 determines if any suspicious files, which can be malicious, were detected on the data storage device 102. This can happen when antivirus database 110 does not contain up-to-date information about known malware. If at step 203 antivirus engine 107 did not detect any suspicious files on device 102, and was able to repair all infected files and remove all detected malware, then work the system 101 continues at step 204, in which antivirus engine 107 will send to the controller 105 information about detected/removed malicious programs and all infected/repaired files. The controller 105 will transmit this data to user interface module 109 for display to the user.

As explained above, depending on the implementation of module 109, the user can also receive audio information representing such events as the end of scan, absence of suspicious files, malicious programs or other threats to the data storage device 102. If the module 109 is implemented to display to the user dynamics of the process of scanning and a variety of color indications after the completion of scanning, which corresponds to certain events, then, in addition to the above, antivirus engine 107 can generate a report in a text format and transmit it via controller 105 for the data storage device 102. The report can include information describing the scanned files, detected malware, infected and repaired or deleted files, the list of actions that should or should not be performed by the user and so on.

In addition, at step 204, the controller 105 may delete the backup data of the device 102, which is stored in the dedicated partition or folder in the memory module 108. The controller 105 may also delete the partition or folder. Then, the antivirus engine 107 transmits to the controller 105 information that the data storage device 102 does not contain suspicious files and that all the infected files were repaired and/or malicious programs are removed.

However, if at step 203, the antivirus engine 107 found suspicious files, i.e., potentially harmful files, on data storage device 102, or portion of the detected infected files have not been repaired, or detected malware was not removed by the antivirus engine 107, the operation of systems 101 continues at step 205, in which antivirus engine 107 will send to the controller 105 information about all detected suspicious files and unrepaired malware on device 102. The controller 105 will transmit this information to the user interface module 109, which according to one example embodiment can display this information to the user along with recommendations for dealing with the suspicious files and unrepaired malware. For example, antivirus engine 107 can recommend to the user to refrain from using with the device 102 and recheck the device 102 using system 101 at a later time. Alternatively, engine 107 can identify the suspicious files and recommend the user to remove these files from the device 102.

At step 206, the system 101 may transmit information about the suspicious files and unrepaired malware to the servers of the antivirus software developer. Also in one example embodiment, system 101 can transmit to the developer information about suspicious files that the user identified as clean. Such actions are carried out by means of the communication module 106. Depending on the implementation, the communication module 106 can use a wired or wireless network connection. In one example embodiment, the communication module 106 may include a USB or Ethernet interface. In this case, the system 101 can be connected using module 106 to any PC, which provides Internet access. The controller 105 receives from the communication module 106 information about available connection to a PC and the controller 105 passes this information to the antivirus engine 107. The antivirus engine 107 informs the controller 105 about the Internet address of the server of the antivirus software developer company, and controller 105 passes this information to the communication module 106, which establishes a connection with the server. Further, antivirus engine 107 transmits the statistical information from the database module 110, which contains information about suspicious files, information about infected files that had not been repaired, and/or information about malicious software, which was not removed by the engine 107. The controller 105 in turn transmits this information to the communication module 106, which sends it to the server of the antivirus software developer for further analysis. If the communication module 106 is implemented using wireless technology, such as LTE or CDMA, which provides direct Internet access without use a third-party PC, then the actions described above, i.e. the transfer of information about suspicious files and unrepaired malware, can be performed by the communication module 106 directly after scanning the device 102.

In response, the antivirus software developer, at step 207, may send updates for the antivirus database 110 and/or antivirus engine 107. The updates may include new virus definitions, which would indicate if suspicious files are in fact malicious or not, scripts or instructions for the repair of suspicious files, and/or removal of malware. The updates information will be received by the communication module 106, sent to the controller 105, and forwarded to the antivirus engine 107, which will in turn update the antivirus database 110.

After updating of the antivirus engine and databases, the antivirus engine 107 can rescan the data storage device 102 using the updated antivirus information, and remove or repair all suspicious files that have been identified as harmful, and also repair some of the previously detected infected files. The operation of system 101 ends at step 204, in which the user is informed through module 109 about the successful completion of the scanning process.

In one example embodiment, the communication module 106 may send information about suspicious files, unrepaired infected files and malware that has not been removed from data storage device 102 to any PC in the network, such as a PC of the network administrator. Therefore, the administrator is informed that a data storage device 102 containing suspicious or malicious programs has been connected to a PC on the network, so that he can take necessary actions to prevent spread of the malicious software to other PCs in the network.

Figure 3:
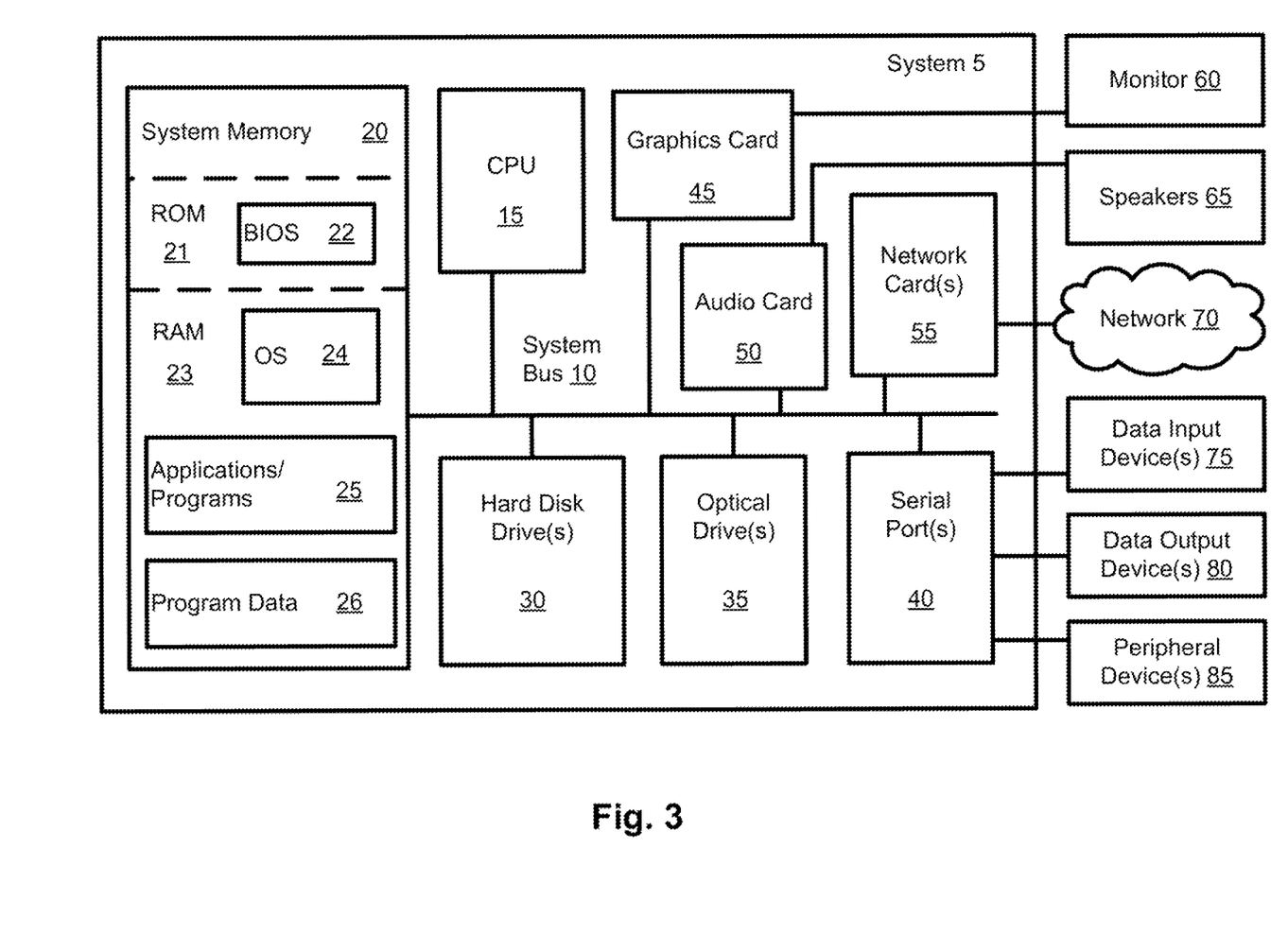
FIG. 3 illustrates one example embodiment of a computer system which can be used to implement the system for detection and repair of malware of the present invention.

FIG. 3 shows an example embodiment of a system for detection and repair of malware on data storage devices implemented as a PC. It should be noted that system 101, is not limited to a PC, but may be implemented as a network server, a notebook, a tablet, a smart phone or other types of data processing or computing devices. The PC 5 may be enclosed in a temper-protective housing 6. The PC 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other types of CPUs.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of the PC 5, such as during start-up. RAM 23 stores operating system 24 (OS), such as Windows® XP or other type of operating system, that is responsible for management and coordination of processes and allocation and sharing of hardware resources in the PC 5. System memory 20 also stores applications and programs 25, such as an antivirus application, such as Kaspersky Antivirus, Kaspersky Antivirus of for Windows workstations, Kaspersky Antivirus for Linux workstations, McAfee Antivirus, Norton Antivirus or similar products. Memory 20 also stores various runtime data 26 used by programs 25.

The PC 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications, databases and program modules/subroutines that implement algorithms and methods disclosed herein. Although the exemplary PC 5 employs magnetic and optical disks, it should be appreciated by those skilled in the art that other types of computer readable media that can store data accessible by the PC 5, such as magnetic cassettes, flash memory cards, digital video disks, RAMs, ROMs, EPROMs, Flash and other types of memory may also be used in alternative embodiments of the system.

The PC 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices 102 and the like. The PC 5 may also include graphics card 45, such as nVidia® GeForce® GT 240M or other video card, for interfacing with a monitor 60 or other video reproduction device. The PC 5 may also include an audio card 50 for reproducing sound via internal or external speakers 65. In addition, PC 5 may include network card(s) 55, such as Ethernet, WiFi, GSM, Bluetooth or other wired, wireless, or cellular network interface for connecting PC 5 to network 70, such as the Internet, and servers of the antivirus company.

PC 5 may have a protective housing 6 that prevents unauthorized access to the system, including entry of commands and information into the system. Only authorized employees, for example, a system administrator or employees of the information security company may have access to the PC 5 and able to open or remove (depending on version) protective housing 6. Also, only these employees can connect data input devices, such as keyboard or mouse, to enter commands and information into computer system 5.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detection and repair of malware on data storage devices, the method comprising:
   connecting an external data storage device to a processing device;
   storing a backup copy of at least a portion of the data contained on the external data storage device to a memory of the processing device;
   scanning the data contained in the data storage device using antivirus software deployed on the processing device;

performing by the antivirus software repair or removal of one or more malicious files or programs found on the data storage device;

if one or more files or programs are corrupted during at least one of said scanning, repairing and removing, replacing by the antivirus software at least a portion of corrupted data in the data storage device with the backup copy stored in the memory of the processing device;

identifying one or more suspicious files or programs found on the data storage device and one or more malicious files or programs that cannot be repaired or removed from the data storage device by the antivirus software;

sending information about the suspicious files or programs and malicious files or programs that cannot be repaired or removed to an antivirus software provider;

receiving updates for the antivirus software from the antivirus software provider; and rescanning at least the suspicious files or programs and malicious files or programs that cannot be repaired or removed by an updated antivirus software.

2. The method of claim wherein connecting an external data storage device to a processing device further comprises at least:
identifying the connected data storage device, including identifying one or more of the name of the data storage device, the size of the memory of the data storage device, the type of the memory of the data storage device, and the manufacturer of data storage device.

3. The method of claim 1, wherein storing a backup copy of at least a portion of the data contained on the external data storage device to a memory of the processing device, further comprises at least:
creating a dedicated partition or folder in the memory of the processing device; and
storing a backup copy of at least a portion of the data from the data storage device in the created partition or folder in the memory of the processing device.

4. The method of claim 1, further comprising reporting the one or more suspicious files or programs and one or more malicious files or programs that cannot be repaired or removed to a user.

5. The method of claim 4, wherein reporting the one or more suspicious files or programs and one or more malicious files or programs that cannot be repaired or removed to the user further comprises at least:
providing user-recommendations for dealing with the suspicious files or programs and with the malicious files or programs that cannot be repaired or removed.

6. The method of claim of 1, wherein updating antivirus software further comprises at least:
updating signatures of known clean and malicious programs; and
updating heuristic analysis algorithms.

7. A computer-based system for detection and repair of malware on data storage devices, the system comprising:
a communication interface for connecting an external data storage device;
a memory storing an antivirus software; and
a controller coupled to the communication interface and the memory, the controller being configured to:
store a backup copy of at least a portion of the data contained on the external data storage device to the memory;
scan the data contained in the data storage device using the antivirus software;
perform by the antivirus software repair or removal of one or more malicious files or programs found on the data storage device;
if one or more files or programs are corrupted during at least one of said scanning, repairing and removing, replace by the antivirus software at least a portion of corrupted data in the data storage device with the backup copy stored in the memory of the processing device;
identify one or more suspicious files or programs found on the data storage device and one or more malicious files or programs that cannot be repaired or removed from the data storage device by the antivirus software;
send information about the suspicious files or programs and malicious files or programs that cannot be repaired or removed to an antivirus software provider;
receive updates for the antivirus software from the antivirus software provider; and
rescan at least the suspicious files or programs and malicious files or programs that cannot be repaired or removed by an updated antivirus software.

8. The system of claim 7, wherein the controller being further configured to at least:
identify the connected data storage device, including identify one or more of the name of the data storage device, the size of the memory of the data storage device, the type of the memory of the data storage device, and the manufacturer of data storage device.

9. The system of claim 7, wherein to store a backup copy of at least a portion of the data contained on the external data storage device to the memory, the controller further configured to at least:
create a dedicated partition or folder in the memory; and
store a backup copy of the data from the data storage device in the created partition or folder in the memory.

10. The system of claim 7, wherein the controller further configured to report the one or more suspicious files or programs and one or more malicious files or programs that cannot be repaired or removed to a user.

11. The system of claim 10, wherein to report the one or more suspicious files or programs and one or more malicious files or programs that cannot be repaired or removed to the user, the controller further configured to at least:
provide user-recommendations for dealing with the suspicious files or programs and with the malicious files or programs that cannot be repaired or removed.

12. The system of claim 7, wherein to update antivirus software, the controller further configured to at least:
update signatures of known dean and malicious programs; and
update heuristic analysis algorithms.

13. A computer program product embedded in a non-transitory computer-readable storage medium, the computer-readable storage medium comprising computer-executable instructions for detection and repair of malware on data storage devices, the medium comprising instructions for:
connect an external data storage device to a processing device;
store a backup copy of at least a portion of the data contained on the external data storage device to a memory of the processing device;
scan the data contained in the data storage device using antivirus software deployed on the processing device;
perform by the antivirus software repair or removal of one or more malicious files or programs found on the data storage device;

if one or more files or programs are corrupted during at least one of said scanning, repairing and removing, replace by the antivirus software at least a portion of corrupted data in the data storage device with the backup copy stored in the memory of the processing device;

identify one or more suspicious files or programs found on the data storage device and one or more malicious files or programs that cannot be repaired or removed from the data storage device by the antivirus software;

send information about the suspicious files or programs and malicious files or programs that cannot be repaired or removed to an antivirus software provider;

receive updates for the antivirus software from the antivirus software provider; and rescan at least the suspicious files or programs and malicious files or programs that cannot be repaired or removed by an updated antivirus software.

14. The product of claim 13, wherein instruction for connecting the data storage device further comprise instructions for at least:

identifying the connected data storage device, including identifying one or more of the name of the data storage device, the size of the memory of the data storage device, the type of the memory of the data storage device, and the manufacturer of data storage device.

15. The product of claim 13, wherein instructions for storing a backup copy of at least a portion of the data contained on the external data storage device to a memory of the processing device, further comprise instructions for at least:

creating a dedicated partition or folder in the memory of the processing device; and storing a backup copy of the data from the data storage device in the created partition or folder in the memory of the processing device.

16. The product of claim 13, further comprising instructions for reporting the one or more suspicious files or programs and one or more malicious files or programs that cannot be repaired or removed to a user.

17. The product of claim 16, wherein instructions for reporting the one or more suspicious files or programs and one or more malicious files or programs that cannot be repaired or removed to the user further comprise instructions for at least:

providing user-recommendations for dealing with the suspicious files or programs and with the malicious files or programs that cannot be repaired or removed.

18. The product of claim 13, wherein instructions for updating antivirus software further comprise instructions for at least:

updating signatures of known clean and malicious programs; and updating heuristic analysis algorithms.

* * * * *